US012440801B2

(12) United States Patent
Grimes et al.

(10) Patent No.: US 12,440,801 B2
(45) Date of Patent: Oct. 14, 2025

(54) SYSTEMS AND METHODS FOR SEPARATION OF $CO_2$ FROM A GASEOUS MIXTURE, COLLECTION, AND CONVERSION

(71) Applicant: Bioleum Corporation, Oklahoma City, OK (US)

(72) Inventors: Craig A. Grimes, Raleigh, NC (US); Kevin Kreisler, Miami, FL (US)

(73) Assignee: Bioleum Corporation, Oklahoma City, OK (US)

( * ) Notice: Subject to any disclaimer, the term of this patent is extended or adjusted under 35 U.S.C. 154(b) by 326 days.

(21) Appl. No.: 17/824,431

(22) Filed: May 25, 2022

(65) Prior Publication Data

US 2022/0401879 A1 Dec. 22, 2022

Related U.S. Application Data

(60) Provisional application No. 63/193,809, filed on May 27, 2021, provisional application No. 63/193,458, filed on May 26, 2021.

(51) Int. Cl.
*B01D 53/24* (2006.01)
*B01D 53/00* (2006.01)
*B01D 53/32* (2006.01)
*B01D 53/86* (2006.01)

(52) U.S. Cl.
CPC .......... *B01D 53/24* (2013.01); *B01D 53/005* (2013.01); *B01D 53/323* (2013.01); *B01D 53/8671* (2013.01); *B01D 2255/802* (2013.01); *B01D 2257/504* (2013.01)

(58) Field of Classification Search
CPC .... B01D 53/24; B01D 53/005; B01D 53/323; B01D 53/8671; B01D 2255/802; B01D 2257/504
USPC ........................................................ 423/220
See application file for complete search history.

(56) References Cited

U.S. PATENT DOCUMENTS

2019/0170046 A1* 6/2019 Hamad ..................... F01N 3/36

FOREIGN PATENT DOCUMENTS

KR   102024753 B1 * 9/2019 .......... B01D 53/002

OTHER PUBLICATIONS

KR-102024753-B1 English translation (Year: 2019).*
Agarwal et al., "Optimisation of vortex tubes and the potential for use in atmospheric separation", J. Phys, D: Appl. Phys. 54(1) (Jan. 2021) 015502. (Year: 2021).*

* cited by examiner

*Primary Examiner* — Anita Nassiri-Motlagh
(74) *Attorney, Agent, or Firm* — Dunlap Codding, P.C.

(57) ABSTRACT

Systems for separating and concentrating $CO_2$ from air or a gas include a vortex tube designed for separating and concentrating $CO_2$ from a gaseous input stream. The vortex tube has an operating design pressure of between 105 psi and 280 psi above atmospheric pressure and produces a concentrated $CO_2$ outlet stream. The concentrated $CO_2$ outlet stream is in fluid connection with a conversion system capable of converting the separated $CO_2$ into another chemical compound.

30 Claims, 2 Drawing Sheets

SYSTEMS AND METHODS FOR SEPARATION OF $CO_2$ FROM A GASEOUS MIXTURE, COLLECTION, AND CONVERSION

CROSS REFERENCE TO RELATED APPLICATIONS/INCORPORATION BY REFERENCE STATEMENT

This application claims priority to U.S. Ser. No. 63/193,458 filed May 26, 2021, and to U.S. Ser. No. 63/193,809 filed May 27, 2021, the entire contents of which are each hereby expressly incorporated herein by reference.

BACKGROUND OF THE INVENTIVE CONCEPTS

1. Field of the Inventive Concepts

The present disclosure relates to methods for separation and capture of CO2 and, more particularly, to a vortex tube designed and operated for separating and thus concentrating $CO_2$ from a gaseous input stream, in which one or more outputs of the vortex tube are connected to or integrated with a technology used for converting the separated $CO_2$ into another chemical compound.

2. Brief Description of Related Art

The rapid increase in the level of atmospheric carbon dioxide, $CO_2$, is a matter of great concern with respect to unwanted heating of the planet and resulting environmental consequences. To date, $CO_2$ separation and capture technologies are based upon the use of chemical adsorbents or cooling of the gas below the gas-liquid transition temperature. Both techniques are energy intensive, while chemical adsorbents have limited lifetimes.

The Ranque-Hilsch vortex tube is a non-moving geometrical structure, or device, capable of dividing a high-pressure input flow into two low-pressure flows of different temperatures. The centripetal, vortex motion in a Ranque-Hilsch vortex tube, created by tangential injection of compressed gas through one or more tangential nozzle(s), gives rise to a non-uniform temperature distribution allowing separation of hotter and colder gases. Similarly, the centripetal force of the gaseous input allows separation of gas species of different mass, as dependent upon the geometrical features of the vortex tube and the velocity and composition of the input gas.

The Ranque-Hilsch vortex tube [1,2] is a device with no moving parts capable of dividing high-pressure gaseous input flow, created by tangential injection of a compressed gas using one or more nozzles, into two low-pressure flows of different temperatures. As such, when compressed gas is injected into the tube a strong vortex-like flow field is established, giving rise to a non-uniform temperature, or density, distribution within the tube. In counter-flow vortex tubes, the most common vortex tube design and superior in its separation properties, a fraction of the feed gas exits as a cold, or denser, stream through an opening in the central zone at one end near the tangential inlet, while the balance of the feed gas exits at the opposite end of the vortex tube as a hot, or less dense, peripheral stream through a throttle valve.

In the prior art, vortex tubes have been shown to provide partially separate gas mixtures. In 1964, Linderstrom-Lang reported use [3] of a counter-flow Ranque-Hilsch vortex tube for separating different gas mixtures, $O_2$—$N_2$, $O_2$—$CO_2$, and $O_2$—He, with a reported small amount of gas separation, well less than 1%. Linderstrom-Lang found superior gas separation with vortex tubes of short length where temperature separation is minimal, and superior temperature separation with vortex tubes of longer length where gas separation effects disappeared. In 2002, Kulkarni and Sardesai [4] reported the separation of a methane-nitrogen mixture using a vortex tube, achieving 1% or less separation efficiency, varying the inlet pressure as well as the hot exit pressure. In 2018, Yun and co-workers [5] reported the separation of $CO_2$ from an air-$CO_2$ mixture. For a $CO_2$-air gaseous input to the vortex, 11.1% $CO_2$ and 89.9% air, a maximum of 8.5% $CO_2$ separation was achieved between the gas streams exiting the cold and hot exits. In addition, as the input pressure varied maximum $CO_2$ separation was achieved at an experimentally determined mass fraction of the total input leaving the cold temperature exit.

Mohammadi and Farhadi [6] reported the use of a vortex tube for separation of liquefied petroleum gas, LPG, (mole fraction %: methane 2.91%, ethane 5%, propane 40.20%, propylene 7%, $C_{4+}$ 44.80%) from a nitrogen (80.2%) and oxygen (19.8%) mixture. The significant difference in molecular weight between the different components enables a relatively high degree of separation efficiency. Operating at 2.36 bar, for an input of LPG (mole fraction 22%) and the $N_2$+$O_2$ mixture, they reported a maximum 87% separation efficiency as dependent upon the mole fraction of the gas leaving the cold exit. Similarly, with LPG as the input, in separating the $C_{4+}$ components from the hydrocarbons of lighter molecular weight, a maximum separation efficiency of 78% was reported. Using computational models, Mohammadi and Garhadi suggest cascades of vortex tubes can be used to further purify the gas streams, as taught by Fekete [7], at efficiencies significantly greater than distillation columns.

SUMMARY OF THE INVENTIVE CONCEPTS

The inventive concepts disclosed and claimed herein relate generally to methods and systems for separating and concentrating $CO_2$ from air or a gas. In one embodiment, a $CO_2$ removal system includes a vortex tube and a conversion system. The vortex tube is designed for separating and thus concentrating $CO_2$ from a gaseous input stream, to produce a concentrated $CO_2$ outlet stream. The vortex tube has an operating design pressure of between 105 psi and 280 psi above atmospheric pressure and the concentrated $CO_2$ outlet stream is in fluid connection with the conversion system. The conversion system is capable of converting the separated $CO_2$ into another chemical compound.

In another embodiment, a method of removing $CO_2$ from a gaseous input stream includes inputting the $CO_2$ containing gas stream to a vortex tube to produce a concentrated $CO_2$ outlet stream. The concentrated $CO_2$ outlet stream is input to a conversion system. The vortex tube is operated at a pressure of between 105 psi and 280 psi above atmospheric pressure. The conversion system converts $CO_2$ in the concentrated outlet stream into another chemical compound.

DETAILED DESCRIPTION

Figure 1:
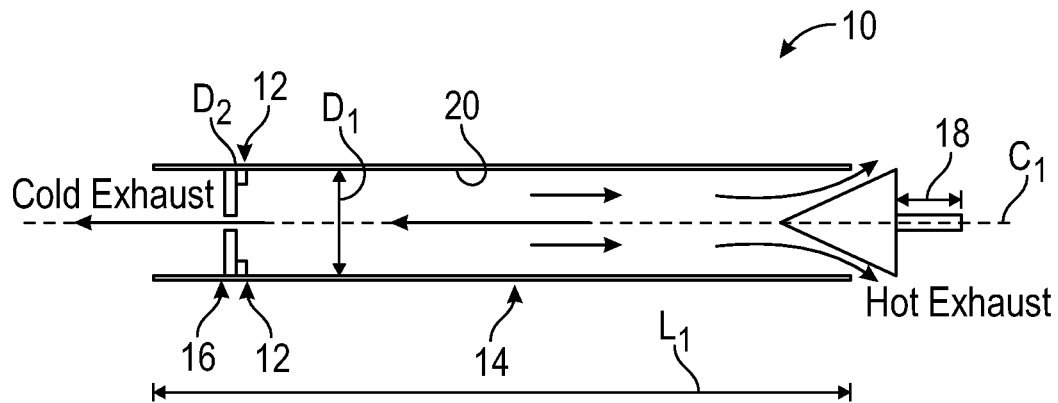
FIG. 1 illustrates an exemplary vortex tube in accordance with the present disclosure.

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary and not exhaustive. Also, it is to be understood that the phraseology and terminology employed herein is for the purpose of description and should not be regarded as limiting.

Unless otherwise defined herein, scientific and technical terms used in connection with the presently disclosed inventive concept(s) shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification.

All patents, published patent applications, and non-patent publications mentioned in the specification are indicative of the level of skill of those skilled in the art to which this presently disclosed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions, assemblies, systems, and/or methods disclosed herein can be made and executed without undue experimentation in light of the present disclosure. While the compositions, assemblies, systems, and methods of the inventive concept(s) have been described in terms of particular embodiments, it will be apparent to those of skill in the art that variations may be applied to the compositions and/or methods and in the steps or in the sequence of steps of the methods described herein without departing from the concept, spirit, and scope of the inventive concept(s). All such similar substitutions and modifications apparent to those skilled in the art are deemed to be within the spirit, scope, and concept of the inventive concept(s) as defined by the appended claims.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the term "about" is used to indicate that a value includes the inherent variation of error for a composition/apparatus/device, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. For example, the term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the phrases "associated with" and "coupled to" include both direct association/binding of two moieties to one another as well as indirect association/binding of two moieties to one another. Non-limiting examples of associations/couplings include covalent binding of one moiety to another moiety either by a direct bond or through a spacer group, non-covalent binding of one moiety to another moiety either directly or by means of specific binding pair members bound to the moieties, incorporation of one moiety into another moiety such as by dissolving one moiety in another moiety or by synthesis, and coating one moiety on another moiety, for example.

As used herein, the term "gas" is used in its broadest sense and includes, for instance, gas mixtures, air, natural gas, a hydrocarbon mixture, gas-vapor mixtures, and/or the like.

Turning now to the drawings and in particular to FIG. 1, certain non-limiting embodiments thereof relate to systems and methods for collection, separation and/or concentration of gas mixtures input to an exemplary vortex tube 10. In some embodiments, such systems and methods may additionally include subsequent storage and/or conversion of one or more of the separated gas species with components (e.g., integral components) to the vortex tube 10. In some embodiments, methods may include enhanced separation of gaseous components (e.g., separation of $CO_2$ from a gaseous mixture), and/or subsequent conversion of separated product with components integral to the vortex tube 10, for example. Further methods herein may include, but are not limited to, achieving gas-separation efficiencies, obtaining high concentrations of one or more desired separated product gas, converting and/or separating one or more gas species, chemically converting one or more of the separated gas species, and combinations thereof.

Generally, the vortex tube 10 may be configured to convert a gas flow initially homogeneous in temperature into two separate flows of higher and lower temperatures. Such separation of the one temperature-homogenous flow, which can be gaseous or liquid, into streams of higher and lower temperature is referred to as the temperature, or energy, separation effect. FIG. 1 illustrates an exemplary vortex tube 10. The vortex tube 10 may include one or more inlet nozzles 12, a vortex chamber 14, a cold-end orifice 16, and a hot end control valve 18. The vortex tube 10 includes an outer encompassing wall 20 and a central axis $C_1$ extending from the cold-end orifice 16 to the hot end control valve 18.

The vortex tube 10 can also be used to separate components of a non-homogeneous gaseous mixture, with greater separation achieved with greater differences in the mass weight of the constituent components. The centripetal force F of an object of mass m moving at tangential speed v along a path with radius of curvature r is $$F=ma=mv^2/r \quad (EQ.\ 1)$$

wherein a is the centripetal acceleration. Alternatively, rewriting in terms of radius, $$r=mv^2/F \quad (EQ.\ 2)$$

In separation of gas species of different molecular weight, those of lighter weight may be accelerated to higher velocities and hence be found at greater radius within the vortex tube 10. Since the hot exit is generally along the outer wall 20 of the vortex tube 10, and the cold exit is generally along the central axis $C_1$, mass and/or velocity of the input gas stream may determine efficiency of separation. For example, if the input velocity of the gas is not sufficient (e.g., less <30 m/s), then temperature-energy separation effects may dominate. Since the gas velocity is higher in shorter tubes than longer tubes (e.g., due to energy dissipation effects), short vortex tubes can be used for separation of gas-stream components, and longer vortex tubes can be used for temperature separation effects.

As higher inlet pressures to the vortex tube 10 correspond to higher gas velocities, higher inlet pressures may be configured to achieve significant separation efficiencies (e.g., when the mass difference between the species is not considerable, such as that between $CO_2$ and nitrogen, with $CO_2$ being 57% heavier, or $CO_2$ and oxygen, with $CO_2$ being 38% heavier). In some embodiments, a two-dimensional (2D) computational fluid dynamics (CFD) model may be configured to model the gas-separation ability of a counter-flow vortex tube. The 2D CFD model, Fluent 6.3.26, may be a steady-state axisymmetric model configured to utilize both the standard and renormalization group K-epsilon (k–ε) turbulence models combined with the compressible Navier-stokes equations. The input may be an air (80% nitrogen, 20% oxygen) and $CO_2$ mixture. In an exemplary embodiment, the vortex tube 10 may be configured with an inner diameter $D_1$ of about 8 mm and a length $L_1$ of about 180 mm. The cold end orifice 16 may have a diameter of about 4 mm. The vortex tube 10 may include four input nozzles 12 with each input nozzle 12 having a diameter of about 2 mm. The distance $D_2$ between the input nozzles 12 and cold end orifice 16 may be about 1 mm. A mesh of 31,140 grid elements may be used, with grid geometry generated using GAMBIT. The temperature at the inlet nozzles 12 may be at about 300 K. Using a second order upwind scheme, the continuity and the momentum equations may be solved for the averaged input mixture properties (velocity, density, and viscosity).

Figure 2:
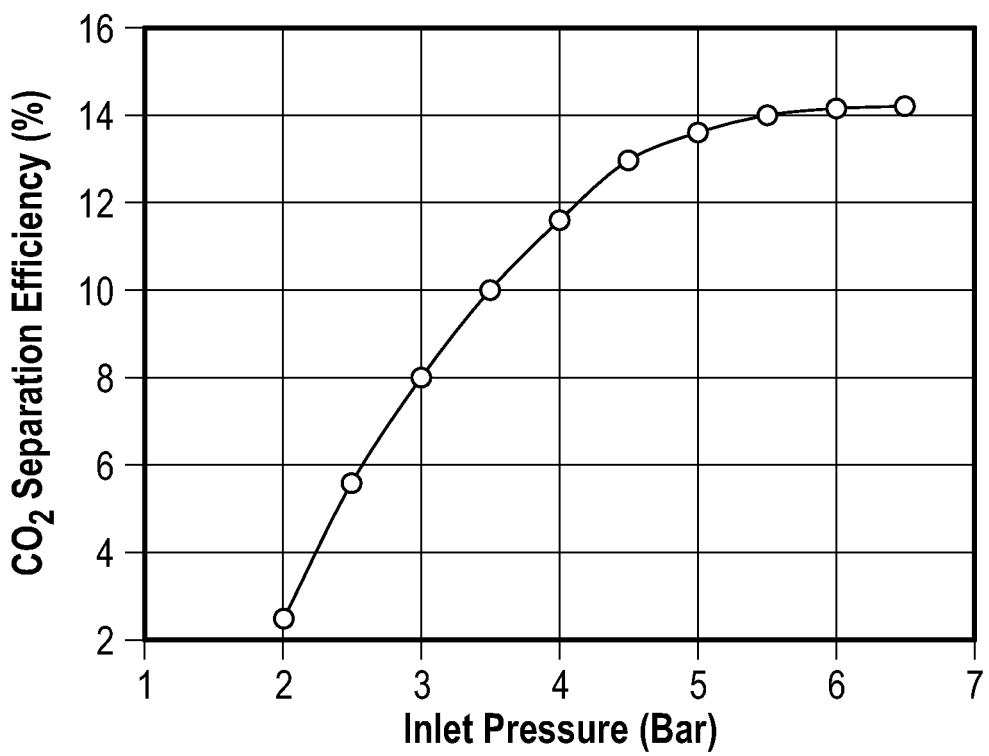
FIG. 2 is a graphical representation of variation in $CO_2$ separation efficiency in accordance with the present disclosure.

With a cold exit mass fraction held constant at 0.5, FIG. 2 shows the $CO_2$-air separation efficiency as a function of inlet pressure for an inlet gas mixture of 20% $CO_2$ and 80% air. Data points were determined numerically as described, while the line is a third order polynomial curve fit. As shown in FIG. 2, as the inlet pressure of the vortex tube 10 increases so does the gas separation efficiency, with the effect ultimately saturating. $CO_2$ separation efficiency is determined by $CO_2$ concentration leaving the hot exit less $CO_2$ concentration leaving cold exit, and is a function of the cold mass fraction which is, in turn, dependent upon vortex tube geometrical features, surface roughness of the inner walls, composition of the input gas, and operating temperature. By configuring the dimensions of the vortex tube 10, and using an operating pressure above 4 bar, $CO_2$ can be separated from a gas mixture at efficiencies greater than 10%. Further, time-varying periodic modulation of the inlet pressure, and hence inlet gas velocity, can be used to promote separation. The time-periodic modulations in pressure, alternating series of higher and then lower pressures, or gas velocity, may be configured to result in the lighter gas specie(s) shifting towards a larger radius, and hence the hot exit. For example, the vortex tube 10 may have a $CO_2$ containing gaseous stream the operating pressure of which may vary with time in a periodic manner to create a pressure wave thereby enhancing separation and/or subsequent collection of the $CO_2$ entering the vortex tube 10. In some embodiments, configurations of the dimensions of the vortex tube 10 may be configured to achieve $CO_2$ separation equal to or greater than 5% with either time varying or steady state velocity of the input gas.

In some embodiments, the gaseous input stream entering the vortex tube 10 has a pressure of 7 bar (102 psia) or above. In one embodiment, the gaseous input stream entering the vortex tube 10 has a pressure greater than 105 psi above atmospheric, for example, between 105 psi and 280 psi above atmospheric. Higher pressures allow the vortex tube 10 to be shorter while increasing the separation based on molecular weight In some embodiments, the vortex tube 10 is configured to separate $CO_2$ from a gaseous input stream wherein the input concentration of $CO_2$ is less than 2000 ppm. In other embodiments, the vortex tube 10 may be configured to separate $CO_2$ from a gaseous input stream primarily comprising of nitrogen and oxygen wherein the input concentration of $CO_2$ is less than 2000 ppm. In some embodiments, the vortex tube 10 may be configured to separate $CO_2$ from a gaseous input stream wherein $CO_2$ comprises 21.5% or more of the input stream.

As the concentration of $CO_2$ in the gas stream entering the vortex tube 10 increases, the curve of FIG. 2 shifts upward, with higher separation efficiencies achieved for higher input $CO_2$ concentrations. Since gas separation efficiency increases with increasing concentration of target species in the gaseous (fluid) input, a series-cascade of vortex tubes 10 can be used to rapidly remove and concentrate one or more gas species.

Figure 3:
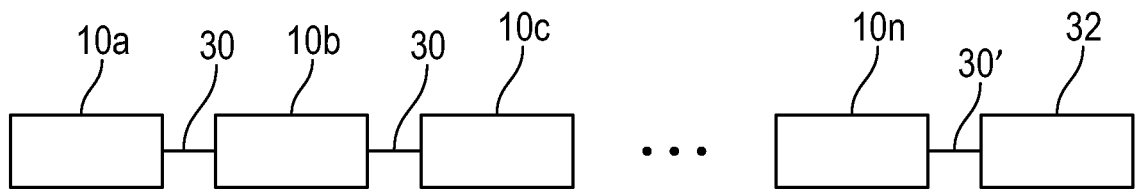
FIG. 3 illustrates a block diagram of an exemplary series cascade of vortex tubes in accordance with the present disclosure.

Referring to FIG. 3, in some embodiments, the series-cascade of the vortex tubes 10a-10n can be used to remove and/or concentrate one or more gas species. In some embodiments, the series cascade of the vortex tubes 10a-10b may be used to remove $CO_2$ directly from the atmosphere, subsequently allowing its sequestration or, ideally, conversion into other chemical compounds such as methane or ethane. For example, the $CO_2$-rich exit of the one vortex tube 10a may be used as the input of a subsequent vortex tube 10b. With regards to the series of vortex tubes 10a-10n, at each stage the dimensions of the vortex tube 10, and operating conditions to include inlet pressure or inlet gas velocity, can be configured to optimize separation properties of specific compound concentrations (e.g., $CO_2$). For example, the initial vortex tube 10a may be configured to separate $CO_2$ present in an input gas stream at less than 2000 ppm. Another vortex tube 10b can be configured to separate $CO_2$ at higher concentrations, and so on, until the desired $CO_2$ concentration, up to 100%, is obtained. Further, the operational features of the vortex tubes 10a-10n may be configured to allow higher efficiency separation as the input concentration of the desired species increases with each stage of the series-cascade.

In some embodiments, one or more vortex tubes 10 may be fabricated via three-dimensional printing techniques.

In some embodiments, operation of one or more vortex tubes 10 may be in ambient temperatures less than 48° C. and/or a temperature at which temperature (energy) separation effects do not overwhelm species separation. In some embodiments, operation of one or more vortex tubes 10 may be in temperatures configured to promote thermolysis of one or more of the gas species input to the vortex tube 10, with separation of resultant product gas species integral to the operation of the vortex tube 10.

In some embodiments, the vortex tube 10 may be configured to separate one or more components of an input gas mixture and convert one or more of the separated species. One or more components of the vortex tube 10 or series cascade of the vortex tubes 10a-10n can be integrated with one or more photocatalytic, triboelectric, electrocatalytic, and/or solar thermal technologies configured to directly convert the separated $CO_2$ into another chemical compound. For example, in some embodiments, one or more surfaces of one or more vortex tubes 10 may be modified with one or more materials (e.g., piezoelectric material) configured to provide triboelectric promoted chemical changes. In using piezoelectric material, passage of the gas stream over the piezoelectric surface generates charge that in turn can be used to promote chemical conversion. In some embodiments, concentrated solar thermal energy (e.g., solar tower), may be configured to elevate the temperature of the vortex tube 10 near or above the dissociation temperature of the separated gas specie(s), allowing simultaneous conversion and separation within the vortex tube 10, or separation and subsequent conversion.

In some embodiments, one or more connecting pipes 30 may be positioned between vortex tubes 10a-10n in the series-connected cascaded vortex tubes. In some embodiments, one or more of the connecting 30 pipe(s) can be formed of optically transparent material (e.g., quartz, glass). In some embodiments, one or more connecting pipe(s) 30 may be lined with a chemical-conversion promoting photocatalyst and/or contain a chemical-conversion promoting photocatalyst. For example, in $CO_2$ separation, the separated $CO_2$ exiting the vortex tube 10a may be directed via at least one connecting pipe 30 to the subsequent vortex tube 10b for further separation and/or concentration. The at least one connecting pipe 30 may be formed of one or more optically transparent material and/or lined with a light-responsive photocatalyst that, in combination with water vapor, under concentrated sunlight, converts the $CO_2$ and $H_2O$ into $CH_4$ or higher order hydrocarbons such as ethane. $CH_4$ being significantly lighter than either $CO_2$, nitrogen, or oxygen, may provide for ready separation from the gas stream. In some embodiments, the one or more vortex tubes 10 and/or connecting pipe(s) 30 may include microscale or nanoscale surface topology of one or more compositions configured to promote conversion of $CO_2$. In some embodiments, a connecting pipe 30' directs the separated $CO_2$ exiting the vortex tube 10n to a $CO_2$ conversion system 32. The $CO_2$ conversion system 32 can be capable of converting the separated $CO_2$ into another chemical compound.

Figure 4:
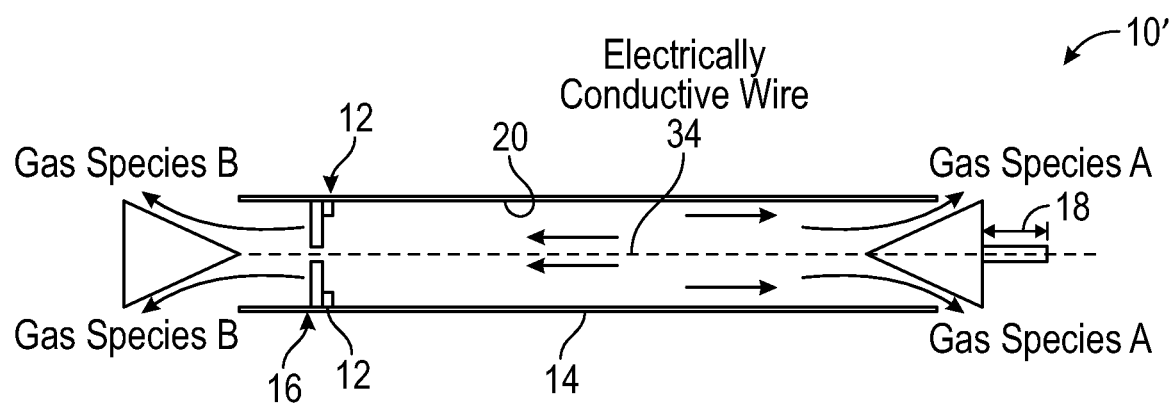
FIG. 4 illustrates an exemplary vortex tube having an axially aligned conductive wire in accordance with the present disclosure.

Referring now to FIG. 4, in one embodiment, an electrically conductive wire 34 can be axially placed within the vortex tube 10' along what is commonly referred to as the cold-axis, and an electric field can be generated between the wire 34 and the outer vortex tube wall 20 of the vortex tube 10'. The electric field can be static or time varying, generated by applying an electric potential between the conductive wire along the cold-axis and the outer vortex tube wall. This electric field can be used to modulate chemical reactions, as well as generate a translational force capable of promoting specie separation. The applied electric field can be used separately, or in combination with the electric field generated by triboelectric means.

Renewable energy sources (e.g., wind-turbines, photovoltaics, and the like) can be used to generate electricity, which in turn can be used to collect and compress air, with the air then passed through one or more vortex tubes 10 for $CO_2$ separation, collection, and/or conversion in accordance with the present disclosure. In some embodiments, one or more auxiliary equipment (e.g., pumps, compressors, and the like) may be exclusively powered by energy originating from renewable sources (e.g., sunlight, wind) including, but not limited to photovoltaics, wind turbines, and the like. In some embodiments, one or more vortex tubes 10 may be used (e.g., connected in series) and between inputs and outputs of the vortex tubes 10, one or more pumps and/or compressors may be positioned to provide operational pressure. Energy used to operate the one or more pumps and/or compressors may be provided exclusively via the one or more renewable sources (e.g., sunlight, wind) by photovoltaics, wind turbines, and/or the like.

In some embodiments, the separated $CO_2$ can be collected, temporarily held in a storage tank, and then in batch-reactor type operation subsequently passed on to a conversion stage, (e.g. such as a high temperature thermolysis unit), with the converted product then sent on to one or more vortex tubes 10 for subsequent separation. In some embodiments, the storage tank may include one or more pressure sensing members configured to detect maximum and/or minimum set pressures in the storage tank. The storage tank may also include at least one Solenoid valve configured to adjust an amount of compound (e.g., $CO_2$), introduced into the storage tank according to pressure variation of the stored compound, and a control member controlling driving on/off of the compressor according to sensed pressure in the storage tank.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposed of this disclosure, it will be understood that numerous changes may be made which will readily suggest themselves to those skilled in the art and which are accomplished within the spirit of the inventive concepts disclosed and claimed herein.

REFERENCES CITED

1. G. J. Ranque, Experiences sur la detente giratoire avec simultanes d'un echappement d'air chaud et d'un enchappement d'air froid, J. Phys. Radium 4 (1933) 112-114.
2. R. Hilsch, The use of the expansion of gases in a centrifugal field as cooling process. Rev. Sci. Instruments 18 (1947) 108-113.
3. C. U. Linderstrom-Lang, Gas separation in the Ranque-Hilsch vortex tube. Int. J. Heat Mass Transfer 7 (1964) 1195-1206.
4. M. R. Kulkarni, C. R. Sardesai, Enrichment of methane concentration via separation of gases using vortex tubes. J. Energy Eng. 128 (2002) 1-12.
5. J. Yun, Y. Kim, S. Yu, Feasibility study of carbon dioxide separation from gas mixture by vortex tube. Int. J. Heat and Mass Transfer 126 (2018) 353-361.
6. S. Mohammadi, F. Farhadi, Experimental and numerical study of the gas-gas separation efficiency in a Ranque-Hilsch vortex tube. Separation and Purification Technology 138 (2014) 177-185.
7. L. A. Fekete, Vortex tube process and apparatus, U.S. Pat. No. 3,546,891 (1970).
8. H. M. Skye, G. F. Nellis, S. A. Klein, Comparison of CFD analysis to empirical data in a commercial vortex tube. Int. J. Refrigeration 29 (2006) 71-80.

What is claimed is:

1. A $CO_2$ removal system comprising:
a vortex tube designed for separating and concentrating $CO_2$ from a gaseous input stream containing $CO_2$ to a concentrated $CO_2$ outlet stream, the vortex tube having an operating design pressure of between 105 psi and 280 psi above atmospheric pressure, wherein the vortex tube has an interior surface topology and composition to promote chemical conversion of $CO_2$ in the concentrated $CO_2$ outlet stream through triboelectric charging; and
wherein the concentrated $CO_2$ outlet stream is in fluid connection with a conversion system capable of converting the separated $CO_2$ into another chemical compound.

2. The $CO_2$ removal system of claim 1, wherein dimensions of the vortex tube are selected to achieve a $CO_2$ separation between 10% and 50% at a preselected operating pressure.

3. The $CO_2$ removal system of claim 1, wherein for a preselected velocity of the gaseous input stream, dimensions of the vortex tube are selected to achieve a higher degree of $CO_2$ separation efficiency with higher concentrations of $CO_2$ in the gaseous input stream.

4. The $CO_2$ removal system of claim 1, further comprising a $CO_2$ storage tank positioned between and in fluid connection with the vortex tube and the conversion system, wherein the $CO_2$ storage tank comprises: a pressure sensing member detecting maximum and minimum set pressures in the $CO_2$ storage tank; a solenoid valve adjusting an amount of $CO_2$ introduced into the $CO_2$ storage tank according to pressure variation of the stored $CO_2$, and a control member controlling driving on/off of a compressor according to sensed pressure in the $CO_2$ storage tank.

5. A $CO_2$ removal system comprising:
a vortex tube designed for separating and concentrating $CO_2$ from a gaseous input stream containing $CO_2$ to a concentrated $CO_2$ outlet stream, the vortex tube having an operating design pressure of between 105 psi and 280 psi above atmospheric pressure; and
wherein the concentrated $CO_2$ outlet stream is in fluid connection with a conversion system capable of converting the separated $CO_2$ into another chemical compound, wherein the conversion system comprises a tube for treating the concentrated $CO_2$ outlet stream, and wherein:
the tube is optionally optically transparent and possesses a microscale or nanoscale surface topology and composition designed to promote conversion of $CO_2$; or
the tube is optically transparent and includes a photocatalyst within which, in combination with light, can be used to promote the photoreduction of $CO_2$.

6. The $CO_2$ removal system of claim 5, wherein the conversion system is selected from the group consisting of a triboelectric, photocatalytic, solar thermal, and electrocatalytic process and combinations thereof.

7. The $CO_2$ removal system of claim 5, wherein dimensions of the vortex tube are selected to achieve a $CO_2$ separation between 10% and 50% at a preselected operating pressure.

8. The $CO_2$ removal system of claim 5, wherein for a preselected velocity of the gaseous input stream, dimensions of the vortex tube are selected to achieve a higher degree of $CO_2$ separation efficiency with higher concentrations of $CO_2$ in the gaseous input stream.

9. The $CO_2$ removal system of claim 5, further comprising a $CO_2$ storage tank positioned between and in fluid connection with the vortex tube and the conversion system, wherein the $CO_2$ storage tank comprises: a pressure sensing member detecting maximum and minimum set pressures in the $CO_2$ storage tank; a solenoid valve adjusting an amount of $CO_2$ introduced into the $CO_2$ storage tank according to pressure variation of the stored $CO_2$, and a control member controlling driving on/off of a compressor according to sensed pressure in the $CO_2$ storage tank.

10. A $CO_2$ removal system comprising:
a vortex tube designed for separating and concentrating $CO_2$ from a gaseous input stream containing $CO_2$ to a concentrated $CO_2$ outlet stream, the vortex tube having an operating design pressure of between 105 psi and 280 psi above atmospheric pressure, wherein the vortex tube includes an electrically conductive wire axially oriented along the length of the vortex tube; and
wherein the concentrated $CO_2$ outlet stream is in fluid connection with a conversion system capable of converting the separated $CO_2$ into another chemical compound.

11. The $CO_2$ removal system of claim 10, wherein the vortex tube is equipped to apply a time-varying or static electric potential between the axially oriented conductive wire and an outer surface of the vortex tube, in turn generating either a time-varying or static electric field.

12. The $CO_2$ removal system of claim 10, wherein the conversion system is selected from the group consisting of a triboelectric, photocatalytic, solar thermal, and electrocatalytic process and combinations thereof.

13. The $CO_2$ removal system of claim 10, wherein dimensions of the vortex tube are selected to achieve a $CO_2$ separation between 10% and 50% at a preselected operating pressure.

14. The $CO_2$ removal system of claim 10, wherein for a preselected velocity of the gaseous input stream, dimensions of the vortex tube are selected to achieve a higher degree of $CO_2$ separation efficiency with higher concentrations of $CO_2$ in the gaseous input stream.

15. The $CO_2$ removal system of claim 10, further comprising a $CO_2$ storage tank positioned between and in fluid connection with the vortex tube and the conversion system, wherein the $CO_2$ storage tank comprises: a pressure sensing member detecting maximum and minimum set pressures in the $CO_2$ storage tank; a solenoid valve adjusting an amount of $CO_2$ introduced into the $CO_2$ storage tank according to pressure variation of the stored $CO_2$, and a control member controlling driving on/off of a compressor according to sensed pressure in the $CO_2$ storage tank.

16. A method of removing $CO_2$ from a gaseous input stream, the method comprising:
inputting a $CO_2$ containing gas stream to the $CO_2$ removal system of claim 1 operating at a pressure of between 105 psi and 280 psi above atmospheric pressure, to produce a concentrated $CO_2$ outlet stream; and
inputting the concentrated $CO_2$ outlet stream to a conversion system capable of converting $CO_2$ into another chemical compound.

17. The method of claim 16, wherein at least one of:
the $CO_2$ containing gas stream is input to the vortex tube at a pressure greater than 4 bar (58 psi);
the concentration of $CO_2$ in the input gas stream is less than 2000 ppm;
the input gas stream primarily comprises nitrogen and oxygen when the concentration of $CO_2$ is less than 2000 ppm;
the input gas stream comprises 21.5% or more of $CO_2$; and/or
an ambient temperature surrounding the vortex tube is equal to or less than 48° C. to promote $CO_2$ separation efficiency.

18. The method of claim 16, further comprising at least one step selected from:
generating power for associated ancillary equipment from renewable sources selected from sunlight and wind;
varying the operating pressure of the vortex tube with time in a periodic manner to create pressure waves thereby enhancing the separation and subsequent collection of the $CO_2$ entering the vortex tube;
adjusting the velocity of the input gas stream to achieve, at an outer wall adjacent to an input stream inlet, a gas velocity greater than 30 m/s;
modulating the velocity of the input gas stream to enhance the separation and subsequent concentration and collection of the $CO_2$ entering the vortex tube;
applying a time-varying or static electric potential between a wire axially oriented within the vortex tube, and an outer surface of the vortex tube, in turn generating either a time-varying or static electric field;
operating the vortex tube at temperatures sufficient to promote thermolysis of one or more gas species input to the vortex tube, and separation of resultant gas species integral to the vortex tube operation; and
combinations thereof.

19. The method of claim 16, the concentrated $CO_2$ outlet stream(s) are used to temporarily fill or partially fill a storage container, from which the stored $CO_2$ is subsequently transferred to a device that converts the $CO_2$ into one or more different chemical compounds.

20. The method of claim 16, wherein the input gas stream containing $CO_2$ has a velocity selected to achieve $CO_2$ separation equal to or greater than 9%, and wherein the velocity is time varying or steady state.

21. A method of removing $CO_2$ from a gaseous input stream, the method comprising:
inputting a $CO_2$ containing gas stream to the $CO_2$ removal system of claim 5 operating at a pressure of between 105 psi and 280 psi above atmospheric pressure, to produce a concentrated $CO_2$ outlet stream; and
inputting the concentrated $CO_2$ outlet stream to a conversion system capable of converting $CO_2$ into another chemical compound.

22. The method of claim 21, wherein at least one of:
the $CO_2$ containing gas stream is input to the vortex tube at a pressure greater than 4 bar (58 psi);
the concentration of $CO_2$ in the input gas stream is less than 2000 ppm;
the input gas stream primarily comprises nitrogen and oxygen when the concentration of $CO_2$ is less than 2000 ppm;
the input gas stream comprises 21.5% or more of $CO_2$; and/or an ambient temperature surrounding the vortex tube is equal to or less than 48° C. to promote $CO_2$ separation efficiency.

23. The method of claim 21, further comprising at least one step selected from:
   generating power for associated ancillary equipment from renewable sources selected from sunlight and wind;
   varying the operating pressure of the vortex tube with time in a periodic manner to create pressure waves thereby enhancing the separation and subsequent collection of the $CO_2$ entering the vortex tube;
   adjusting the velocity of the input gas stream to achieve, at an outer wall adjacent to an input stream inlet, a gas velocity greater than 30 m/s;
   modulating the velocity of the input gas stream to enhance the separation and subsequent concentration and collection of the $CO_2$ entering the vortex tube;
   applying a time-varying or static electric potential between a wire axially oriented within the vortex tube, and an outer surface of the vortex tube, in turn generating either a time-varying or static electric field;
   operating the vortex tube at temperatures sufficient to promote thermolysis of one or more gas species input to the vortex tube, and separation of resultant gas species integral to the vortex tube operation; and
   combinations thereof.

24. The method of claim 21, the concentrated $CO_2$ outlet stream(s) are used to temporarily fill or partially fill a storage container, from which the stored $CO_2$ is subsequently transferred to a device that converts the $CO_2$ into one or more different chemical compounds.

25. The method of claim 21, wherein the input gas stream containing $CO_2$ has a velocity selected to achieve $CO_2$ separation equal to or greater than 9%, and wherein the velocity is time varying or steady state.

26. A method of removing $CO_2$ from a gaseous input stream, the method comprising:
   inputting a $CO_2$ containing gas stream to the $CO_2$ removal system of claim 1 operating at a pressure of between 105 psi and 280 psi above atmospheric pressure, to produce a concentrated $CO_2$ outlet stream; and
   inputting the concentrated $CO_2$ outlet stream to a conversion system capable of converting $CO_2$ into another chemical compound.

27. The method of claim 26, wherein at least one of:
   the $CO_2$ containing gas stream is input to the vortex tube at a pressure greater than 4 bar (58 psi);
   the concentration of $CO_2$ in the input gas stream is less than 2000 ppm;
   the input gas stream primarily comprises nitrogen and oxygen when the concentration of $CO_2$ is less than 2000 ppm;
   the input gas stream comprises 21.5% or more of $CO_2$; and/or
   an ambient temperature surrounding the vortex tube is equal to or less than 48° C. to promote $CO_2$ separation efficiency.

28. The method of claim 26, further comprising at least one step selected from:
   generating power for associated ancillary equipment from renewable sources selected from sunlight and wind;
   varying the operating pressure of the vortex tube with time in a periodic manner to create pressure waves thereby enhancing the separation and subsequent collection of the $CO_2$ entering the vortex tube;
   adjusting the velocity of the input gas stream to achieve, at an outer wall adjacent to an input stream inlet, a gas velocity greater than 30 m/s;
   modulating the velocity of the input gas stream to enhance the separation and subsequent concentration and collection of the $CO_2$ entering the vortex tube;
   applying a time-varying or static electric potential between a wire axially oriented within the vortex tube, and an outer surface of the vortex tube, in turn generating either a time-varying or static electric field;
   operating the vortex tube at temperatures sufficient to promote thermolysis of one or more gas species input to the vortex tube, and separation of resultant gas species integral to the vortex tube operation; and
   combinations thereof.

29. The method of claim 26, the concentrated $CO_2$ outlet stream(s) are used to temporarily fill or partially fill a storage container, from which the stored $CO_2$ is subsequently transferred to a device that converts the $CO_2$ into one or more different chemical compounds.

30. The method of claim 26, wherein the input gas stream containing $CO_2$ has a velocity selected to achieve $CO_2$ separation equal to or greater than 9%, and wherein the velocity is time varying or steady state.

* * * * *